United States Patent
Andrews

(10) Patent No.: US 12,137,012 B2
(45) Date of Patent: *Nov. 5, 2024

(54) CONSTANT ENVELOPE BI-PHASE SHIFT KEYING (CE-BPSK) MODULATION FOR "MODE S" AND OTHER COMMUNICATION APPLICATIONS

(71) Applicant: Raytheon Company, Waltham, MA (US)

(72) Inventor: Macdonald J. Andrews, Douglas, MA (US)

(73) Assignee: Raytheon Company, Tewksbury, MA (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/812,403

(22) Filed: Jul. 13, 2022

(65) Prior Publication Data

US 2022/0376962 A1 Nov. 24, 2022

Related U.S. Application Data

(63) Continuation of application No. 17/306,648, filed on May 3, 2021, now Pat. No. 11,411,786.

(51) Int. Cl.
*H04L 27/20* (2006.01)
(52) U.S. Cl.
CPC .................. *H04L 27/20* (2013.01)
(58) Field of Classification Search
CPC ...................................................... H04L 27/20
See application file for complete search history.

(56) References Cited

U.S. PATENT DOCUMENTS

| | | | |
|---|---|---|---|
| 4,680,777 A | 7/1987 | Saha | |
| 7,013,115 B2* | 3/2006 | Collin | H04L 27/20 |
| | | | 375/279 |
| 7,184,491 B2* | 2/2007 | Suzuki | H04L 27/20 |
| | | | 332/107 |
| 9,571,317 B1 | 2/2017 | Kossin | |
| 10,339,623 B2 | 7/2019 | Kossin | |
| 10,742,462 B2 | 8/2020 | Rada | |
| 11,411,786 B1* | 8/2022 | Andrews | H04L 27/20 |
| 2009/0296853 A1* | 12/2009 | Doong | H04L 27/2007 |
| | | | 375/296 |
| 2017/0230220 A1 | 8/2017 | Anwyl et al. | |

OTHER PUBLICATIONS

Yazdani, "Generation of Constant Envelope Bandlimited BPSK Signal," Department of Electrical Engineering, University of Ottawa, Jun. 1981, 115 pages.

(Continued)

*Primary Examiner* — Betsy Deppe

(57) ABSTRACT

A method includes obtaining an in-phase (I) input signal and a quadrature (Q) input signal at a quadrature modulator. The method also includes performing constant envelope bi-phase shift keying (CE-BPSK) modulation using the quadrature modulator to generate a modulated output signal. The modulated output signal includes a CE-BPSK modulated waveform containing phase reversals, and the CE-BPSK modulated waveform has a substantially-constant amplitude during the phase reversals.

20 Claims, 6 Drawing Sheets

(56) References Cited

OTHER PUBLICATIONS

Park, "Power and bandwidth efficient constant-envelope BPSK signals and its continuous phase modulation Interpretation", IEE Proc.-Commun., vol. 152, No. 3, Jun. 2005, pp. 288-294.
Hemp et al., "Low Power IQ Modulator for Digital Communications," LT Journal of Analog Innovation, Nov. 2015, pp. 20-24.
Linear Technology Corp., "2GHz to 14GHz: Microwave Mixer with Wideband DC-6GHz IF," LTC5548, 2016, 20 pages.
International Search Report and Written Opinion of the International Searching Authority dated Jan. 30, 2023 in connection with International Patent Application No. PCT/US2022/024089, 10 pages.
Yazdani et al., "Constant Envelope Bandlimited BPSK Signal," IEEE Transactions on Communications, Jun. 1980, pp. 889-897.

\* cited by examiner

CONSTANT ENVELOPE BI-PHASE SHIFT KEYING (CE-BPSK) MODULATION FOR "MODE S" AND OTHER COMMUNICATION APPLICATIONS

CROSS-REFERENCE TO RELATED APPLICATION AND PRIORITY CLAIM

This application claims priority under 35 U.S.C. § 120 as a continuation of U.S. patent application Ser. No. 17/306,648 filed on May 3, 2021, which is hereby incorporated by reference in its entirety.

GOVERNMENT LICENSE RIGHTS

This invention was made with government support under DTFASA-17C-00649 awarded by the United States Department of Transportation. The government has certain rights in the invention.

TECHNICAL FIELD

This disclosure relates generally to modulation systems. More specifically, this disclosure relates to constant envelope bi-phase shift keying (CE-BPSK) modulation for "mode S" and other communication applications.

BACKGROUND

Bi-phase shift keying (also known as binary phase shift keying) (BPSK) is a digital modulation technique in which the binary values "zero" and "one" are represented by different carrier phases that are 180° apart from each other. When data values transition from a "zero" to a "one" (or vice versa), a modulated data signal transitions from one phase to another phase, such as from 0° to 180° or from 180° to 0°. This change of phase is often referred to as "phase reversal."

SUMMARY

This disclosure relates to constant envelope bi-phase shift keying (CE-BPSK) modulation for "mode S" and other communication applications.

In a first embodiment, a method includes obtaining an in-phase (I) input signal and a quadrature (Q) input signal at a quadrature modulator. The method also includes performing CE-BPSK modulation using the quadrature modulator to generate a modulated output signal. The modulated output signal includes a CE-BPSK modulated waveform containing phase reversals, and the CE-BPSK modulated waveform has a substantially-constant amplitude during the phase reversals.

In a second embodiment, an apparatus includes a quadrature modulator configured to obtain an I input signal and a Q input signal and perform CE-BPSK modulation to generate a modulated output signal. The modulated output signal includes a CE-BPSK modulated waveform containing phase reversals, and the CE-BPSK modulated waveform has a substantially-constant amplitude during the phase reversals.

In a third embodiment, a system includes a quadrature modulator configured to obtain an I input signal and a Q input signal and perform CE-BPSK modulation to generate a modulated output signal. The system also includes a filter configured to filter the modulated output signal and generate a filtered modulated output signal. The system further includes a saturated power amplifier configured to amplify the filtered modulated output signal and generate an amplified filtered modulated output signal. The modulated output signal includes a CE-BPSK modulated waveform containing phase reversals, and the CE-BPSK modulated waveform has a substantially-constant amplitude during the phase reversals.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1A:
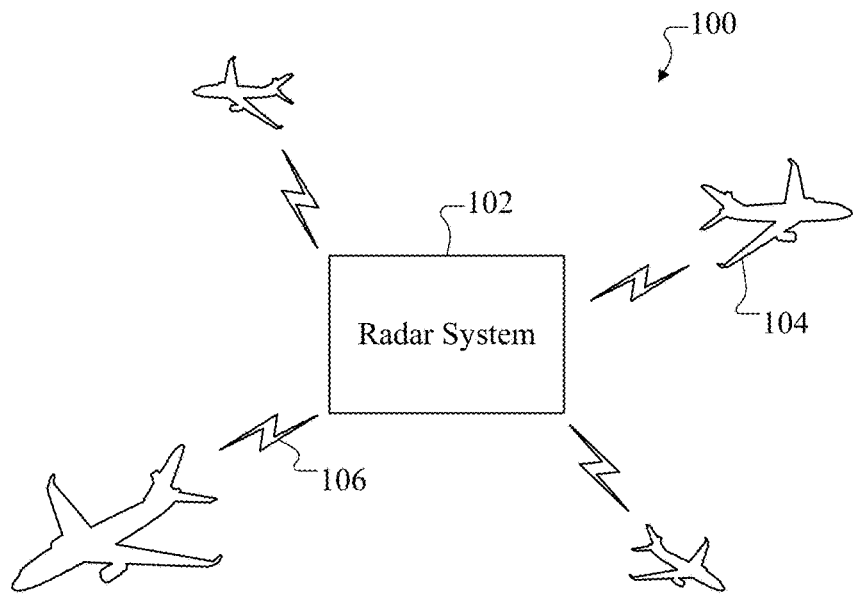
FIGS. 1A and 1B illustrate example systems supporting constant envelope bi-phase shift keying (CE-BPSK) modulation according to this disclosure.

FIGS. 1 through 6, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, bi-phase shift keying (also known as binary phase shift keying) (BPSK) is a digital modulation technique in which the binary values "zero" and "one" are represented by different carrier phases that are 180° apart from each other. When data values transition from a "zero" to a "one" (or vice versa), a modulated data signal transitions from one phase to another phase, such as from 0° to 180° or from 180° to 0°. This change of phase is often referred to as "phase reversal."

Traditional BPSK modulation uses bi-phase modulation in which the phase of a radio frequency (RF) waveform is simply reversed at the bit transition time. In other cases, rather than changing the phase of the RF waveform instantaneously, a shaped transition (such as root raised cosine shaping) is used to help contain spectral energy within a defined channel bandwidth. However, in both of these cases, the amplitude of the RF waveform drops to zero and then increases back to full amplitude during a phase reversal. This can result in a "dropout" of the RF waveform during the phase reversal.

BPSK modulation can potentially be used in a number of applications. For example, "mode S" secondary surveillance radars (SSRs) are being developed to interrogate aircraft, such as to identify aircraft and obtain information from the aircraft. In this example application, BPSK modulation might be used to encode information onto signals that are transmitted to different aircraft being interrogated. For instance, a BPSK-modulated signal might be used to identify an interrogation mode, address a selected aircraft, and engage in data communication with the selected aircraft. As part of this process, specific pulse spacings and phase reversals may be used to initiate or suppress replies from aircraft. These types of radars also typically employ filters and saturated power amplifiers (which may incorporate amplitude limiters) in their transmit paths to produce interrogation waveforms that are transmitted to the aircraft. In another example application, BPSK modulation might be used to encode data onto an RF signal that is sent from one station to another station over a physical or wireless data communication link. As a particular example of this, the MIL-188-165B standard indicates that BPSK modulation can be used with square root raised cosine baseband filtering and linear amplification to generate a communication waveform with acceptable modulation quality and acceptable spectral confinement performance.

Traditional BPSK modulation is typically used in systems having linear amplifiers and defined baseband matched filtering. Some systems that transmit modulated data, such as SSR systems or digital radios, use saturated power amplifiers due to their much-higher power efficiencies and use filters with specified time responses. However, the amplitude variations that are inherent in traditional BPSK modulation can cause various undesirable effects when used in these types of systems. For example, amplitude changes passing through non-linear (saturated) amplifiers can produce undesirable artifacts like spectral regrowth (widening), amplitude modulation-phase modulation conversion (constellation distortion), and amplitude settling time effects (ringing). Amplitude changes passing through narrow filters can result in amplitude settling and sometime phase settling. Among other things, these artifacts can create spectral components caused by non-linear distortions of an amplitude- and phase-modulated BPSK signal. The phase reversal in a BPSK waveform in particular can have a profound negative effect on both spectral emissions and amplifier phase and amplitude settling performance.

This disclosure provides techniques for constant envelope BPSK (CE-BPSK) modulation. While standard BPSK modulation produces a waveform with a substantially-constant frequency and a varying amplitude, CE-BPSK modulation produces a waveform with a substantially-constant amplitude (a substantially-constant envelope) and a varying frequency caused by phase accelerations and/or decelerations. As described in more detail below, bi-phase modulation is achieved using an I-Q quadrature modulator to produce a modulated waveform. The modulated waveform has a substantially-constant amplitude even when the phase of the modulated waveform transitions during phase reversals, meaning a substantially-constant envelope is maintained rather than substantially varying the amplitude of the modulated waveform.

During CE-BPSK modulation, the I-Q quadrature modulator is used to generate the 0° to 180° and 180° to 0° phase modulations using I and Q signals. Rather than causing a signal vector associated with the modulated waveform to pass through zero on a polar plane, both the I and Q signals are controlled so that the amplitude of the modulated waveform maintains a substantially-constant power level as the phase of the modulated waveform is transitioned from 0° to 180° and vice versa. In some embodiments, in order to enact a 180° phase change in a CE-BPSK modulated waveform, the in-phase (I) input's voltage to the quadrature modulator can follow a one-half cycle sine waveform, and the quadrature (Q) input's voltage to the quadrature modulator can follow a one-half cycle cosine waveform. This allows for "rotation" of the phase in a CE-BPSK modulated waveform, rather than "flipping" of the phase as is done in standard BPSK. Thus, the described CE-BPSK modulation techniques can make use of quadrature-phase modulators (which are often used with modulation techniques such as QPSK, 8-PSK, and 16-QAM) but use the I and Q inputs to the quadrature-phase modulator to steer a signal vector around a polar plane at a substantially-constant amplitude (substantially-constant envelope) rather than traversing through the origin with a changing amplitude (as in standard BPSK).

A saturated power amplifier can be used to amplify the modulated waveform while remaining in saturation and does not have an amplitude recovery time as a result. A filter (which would normally have an amplitude time response) between the I-Q quadrature modulator and the saturated power amplifier may only have to settle due to phase transitions (rather than both amplitude and phase transitions) and can have reduced amplitude and phase transients. An amplitude limiter, which typically has a turn-on time or recovery time due to the application and removal of the modulated waveform amplitude, can maintain its "on" and limiting mode of operation since the modulated waveform does not have an amplitude dropout during a phase reversal.

In this way, CE-BPSK modulation can provide the same information encoding capabilities and data rates as standard BPSK modulation but removes the amplitude dropouts associated with phase reversals in standard BPSK. Because of this, CE-BPSK modulation can be used with saturated power amplifiers and amplitude-sensitive components like filters and amplitude limiters. Moreover, since CE-BPSK can be used with radar transmitters, digital radios, and other devices or systems that use saturated power amplifiers, this may allow the devices or systems to achieve better amplitude settling characteristics, meet phase reversal duration requirements, and remove amplitude dropouts.

In the following discussion, CE-BPSK is described as being used in radar systems and communication systems with saturated power amplifiers. However, CE-BPSK modulation may be used in any other suitable devices or systems in which CE-BPSK modulation may be used to help maintain accurate modulation constellation points and substantially-constant amplitudes, which may reduce the possibility of amplitude distortion and spectral regrowth into adjacent frequencies. Also, in the following discussion, a "substantially-constant" value (such as a "substantially-constant amplitude" or "substantially-constant envelope") refers to a value that remains within exactly or about 20% of a nominal value. Thus, a "substantially-constant amplitude" or a "substantially-constant envelope" refers to an amplitude or envelope that experiences no more than exactly or about ±2 dB of variation. Note, however, that variations of other percentages may be considered "substantially-constant," such as any integer or other percentage less than 20%.

Figure 1B:
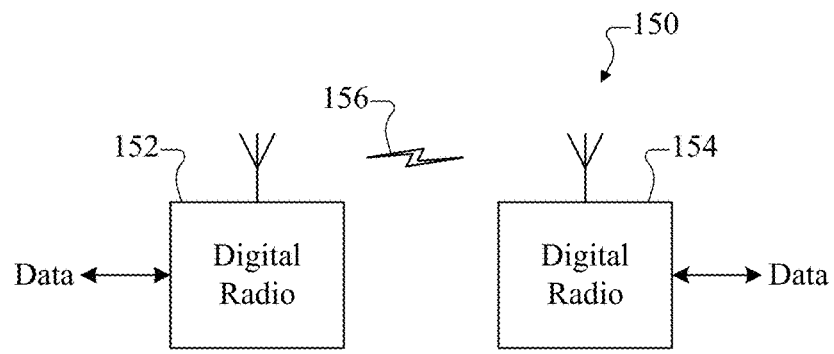

FIGS. 1A and 1B illustrate example systems supporting CE-BPSK modulation according to this disclosure. In particular, FIG. 1A illustrates an example system 100 supporting CE-BPSK modulation for radar purposes, and FIG. 1B illustrates an example system 150 supporting CE-BPSK modulation for communication purposes. Note that these are examples only and that CE-BPSK modulation may be used in any other suitable systems and for any other suitable purposes.

As shown in FIG. 1A, the system 100 includes a radar system 102 that is used to identify and interact with various aircraft 104 around the radar system 102. Various wireless communications 106 occur between the radar system 102 and the aircraft 104. For example, the radar system 102 may transmit an interrogation signal for all aircraft 104 or for specific aircraft 104, and one or more of the aircraft 104 may respond by transmitting requested information to the radar system 102. The radar system 102 includes any suitable structure configured to transmit wireless signals towards and receive wireless signals from aircraft 104. Each aircraft 104 includes any suitable type of aircraft. In this example, the aircraft 104 take the form of commercial airplanes, although the aircraft 104 may also or alternatively represent military aircraft, drones or other unmanned aerial vehicles (UAVs), or other objects that can fly through the air. In other cases, the radar system 102 may be used to detect ground vehicles or other ground-based objects or naval ships or other surface vessels.

In some embodiments, the radar system 102 can represent a secondary surveillance radar that supports a "mode S" type of operation. The "mode S" operation is used to interrogate specific aircraft 104, such as by identifying a specific aircraft 104 and obtaining information from the specific aircraft 104. As noted above, part of the "mode S" operation may involve the radar system 102 using specific pulse spacings and phase reversals to initiate or suppress replies from the aircraft 104.

There may be very strict timing requirements placed on the radar system 102 when functioning in the "mode S" operation or another mode of operation. For example, during a phase reversal in a transmitted signal forming a wireless communication 106, the radar system 102 may be required to perform the phase reversal in an extremely fast manner. As a particular example, International Civil Aviation Organization (ICAO) standards indicate that a transmitted signal should transition from a phase of 10° to a phase of 170° within 80 nanoseconds during a 0° to 180° phase reversal. These types of requirements may be difficult or impossible to meet using standard BPSK modulation approaches.

As described in more detail below, the radar system 102 supports the use of CE-BPSK modulation using an I-Q quadrature modulator, where the quadrature modulator is used to produce the 0° to 180° and 180° to 0° phase modulations in the wireless communications 106. Because of the advantages or benefits of CE-BPSK modulation, various requirements (such as the 80-nanosecond requirement above) can be satisfied more easily in the radar system 102. This is because CE-BPSK modulation reduces or eliminates the presence of amplitude dropouts in a CE-BPSK modulated waveform.

As shown in FIG. 1B, the system 150 includes multiple digital radios 152, 154 that are configured to communicate with one another over a communication link 156. In this example, the digital radios 152, 154 represent wireless radios that can communicate over a wireless communication link 156. However, the digital radios 152, 154 may also or alternatively be configured to communicate over a physical communication link 156. Also, in this example, the digital radios 152, 154 are shown as supporting bi-directional communications, although unidirectional communication may occur between the digital radios 152, 154. In addition, while two digital radios 152, 154 are shown here, the system 150 may include any suitable number of digital radios in any suitable configuration, and the digital radios may communicate over any suitable communication links. The digital radios 152, 154 may engage in any suitable communications via the communication link 156, such as exchanging continuous or pulsed streams of data-modulated radio signals.

As described in more detail below, the digital radios 152, 154 support the use of CE-BPSK modulation using an I-Q quadrature modulator, where the quadrature modulator is used to produce the 0° to 180° and 180° to 0° phase modulations used for communications between the digital radios 152, 154. Again, the CE-BPSK modulation reduces or eliminates the presence of amplitude dropouts in a CE-BPSK modulated waveform transmitted between the digital radios 152, 154.

Although FIGS. 1A and 1B illustrate examples of systems 100, 150 supporting CE-BPSK modulation, various changes may be made to FIGS. 1A and 1B. For example, CE-BPSK modulation may be used in any other suitable system in which BPSK modulation may be needed or desired. A system that uses CE-BPSK modulation may or may not use radar signals to identify and interact with aircraft and may or may not use digital radios for communication purposes. CE-BPSK modulation can be used to support any desired communications involving any suitable components over physical or wireless media.

Figure 2:
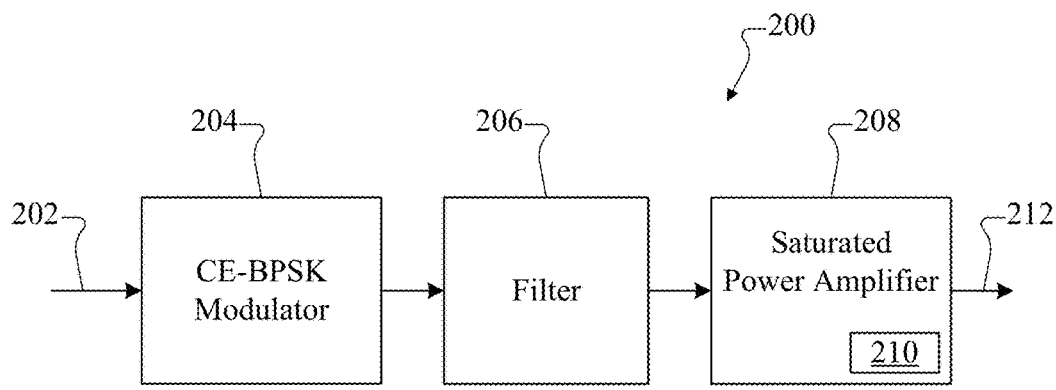
FIG. 2 illustrates a portion of an example transmit path supporting CE-BPSK modulation according to this disclosure.

FIG. 2 illustrates a portion of an example transmit path 200 supporting CE-BPSK modulation according to this disclosure. The transmit path 200 may, for example, be used within the radar system 102 of FIG. 1A to generate signals used for at least some of the wireless communications 106 between the radar system 102 and the aircraft 104 or used within a digital radio 152, 154 of FIG. 1B to generate signals used for communication over the communication link 156. Note, however, that the transmit path 200 may be used in any other suitable system and for any other suitable purpose.

As shown in FIG. 2, the transmit path 200 receives an input data signal 202 at a CE-BPSK modulator 204. The input data signal 202 may define the information to be encoded onto a modulated RF signal. For example, when used with a radar system 102, the input data signal 202 may include an identification of an interrogation mode to be used and an address of a selected aircraft to respond to an interrogation. When used with a digital radio 152, 154, the input data signal 202 may include the data to be transmitted to another digital radio. The input data signal 202 may be received from any suitable source(s) and represent data in any suitable manner. The CE-BPSK modulator 204 performs CE-BPSK modulation in order to modulate an RF waveform and encode information from the input data signal 202 onto the RF waveform, thereby producing a modulated waveform. The CE-BPSK modulator 204 can use the techniques describes below to perform the CE-BPSK modulation.

The modulated waveform generated by the CE-BPSK modulator 204 is provided to a filter 206, which filters the modulated waveform in order to generate a filtered modulated waveform. The filter 206 includes any suitable structure configured to filter an RF signal. In some embodiments, the filter 206 represents a narrowband filter that is designed to substantially block all frequencies from the filtered modulated waveform except those frequencies within a narrow range containing the modulated data to be transmitted.

The filtered modulated waveform is provided to a power amplifier 208, which amplifies the filtered modulated waveform to generate an amplified modulated waveform. In some embodiments, the power amplifier 208 represents a saturated power amplifier, meaning the power amplifier operates in a saturation mode and therefore generates an amplified modulated waveform having a substantially-constant power level. The power amplifier 208 includes any suitable structure configured to amplify an RF signal. The power amplifier 208 in this example includes an amplitude limiter 210, which limits the amplitude of the amplified modulated waveform to thereby produce a substantially-constant amplitude output modulated signal 212. For example, the amplitude limiter 210 can be used to help prevent the output modulated signal 212 from having an excessively large amplitude or envelope for a given application. The amplitude limiter 210 includes any suitable structure configured to limit or otherwise control the amplitude of an RF signal and maintain a substantially-constant level, which may occur intentionally (such as by limiting waveform dynamics) or naturally (such as by using amplifier saturation).

The output modulated signal 212 may be used in any suitable manner depending on the application. For example, in embodiments where communications occur over physical media, the output modulated signal 212 may be provided to one or more destinations over one or more electrical conductors or other transmission media. In embodiments where wireless communications occur over the air or through empty space, the output modulated signal 212 may be provided to one or more antennas for wireless transmission.

Although FIG. 2 illustrates a portion of one example of a transmit path 200 supporting CE-BPSK modulation, various changes may be made to FIG. 2. For example, CE-BPSK modulation may be used in any other suitable transmit path in which BPSK modulation may be needed or desired. Also, CE-BPSK modulation can be used to support any desired communications between components. In addition, some transmit paths can be much more complex than the simplified version shown here, such as when a transmit path includes multiple saturated power amplifiers, filters, amplitude limiters, and/or gain or level controls. CE-BPSK modulation may be used in any of these transmit paths to modulate data onto an RF waveform.

Figure 3A:
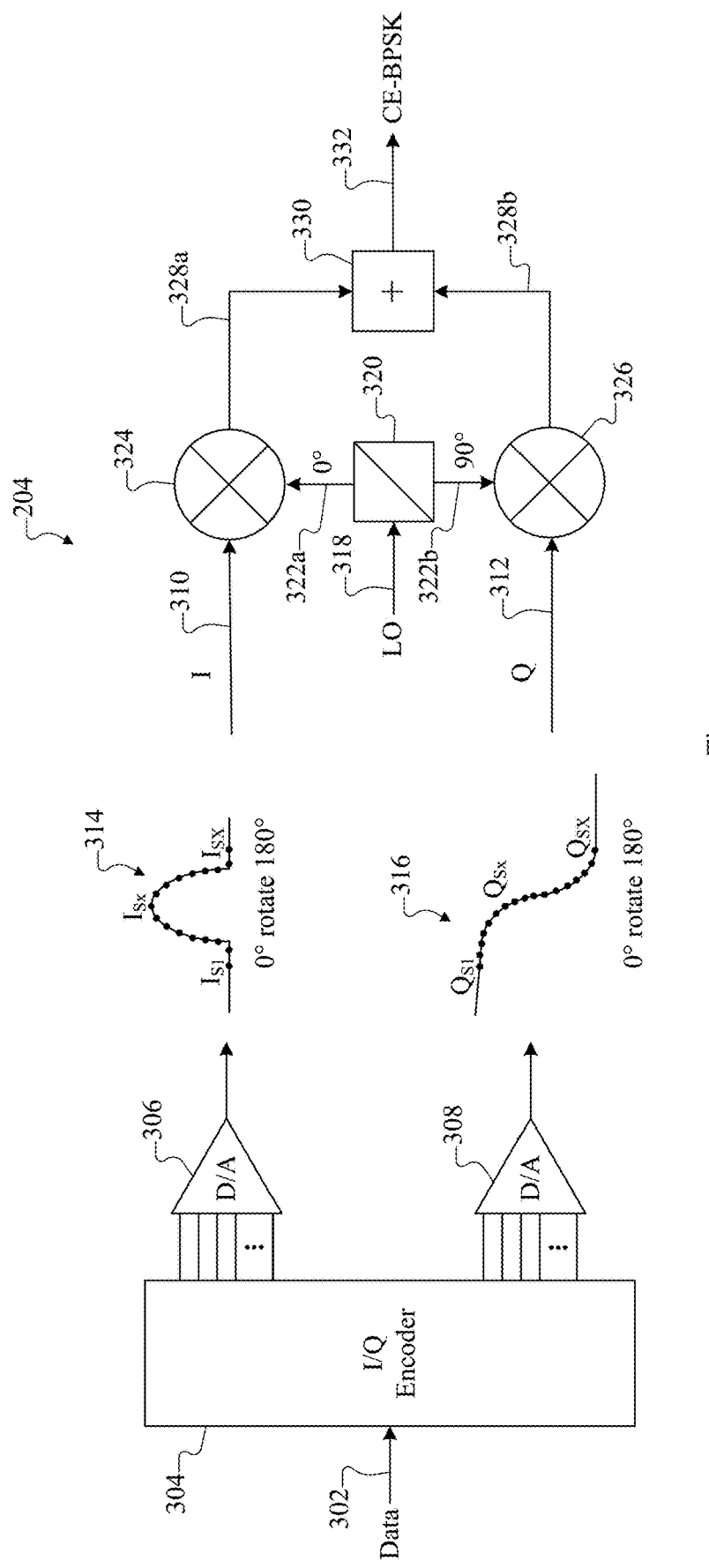
FIGS. 3A and 3B illustrate example CE-BPSK modulators according to this disclosure.
Figure 3B:
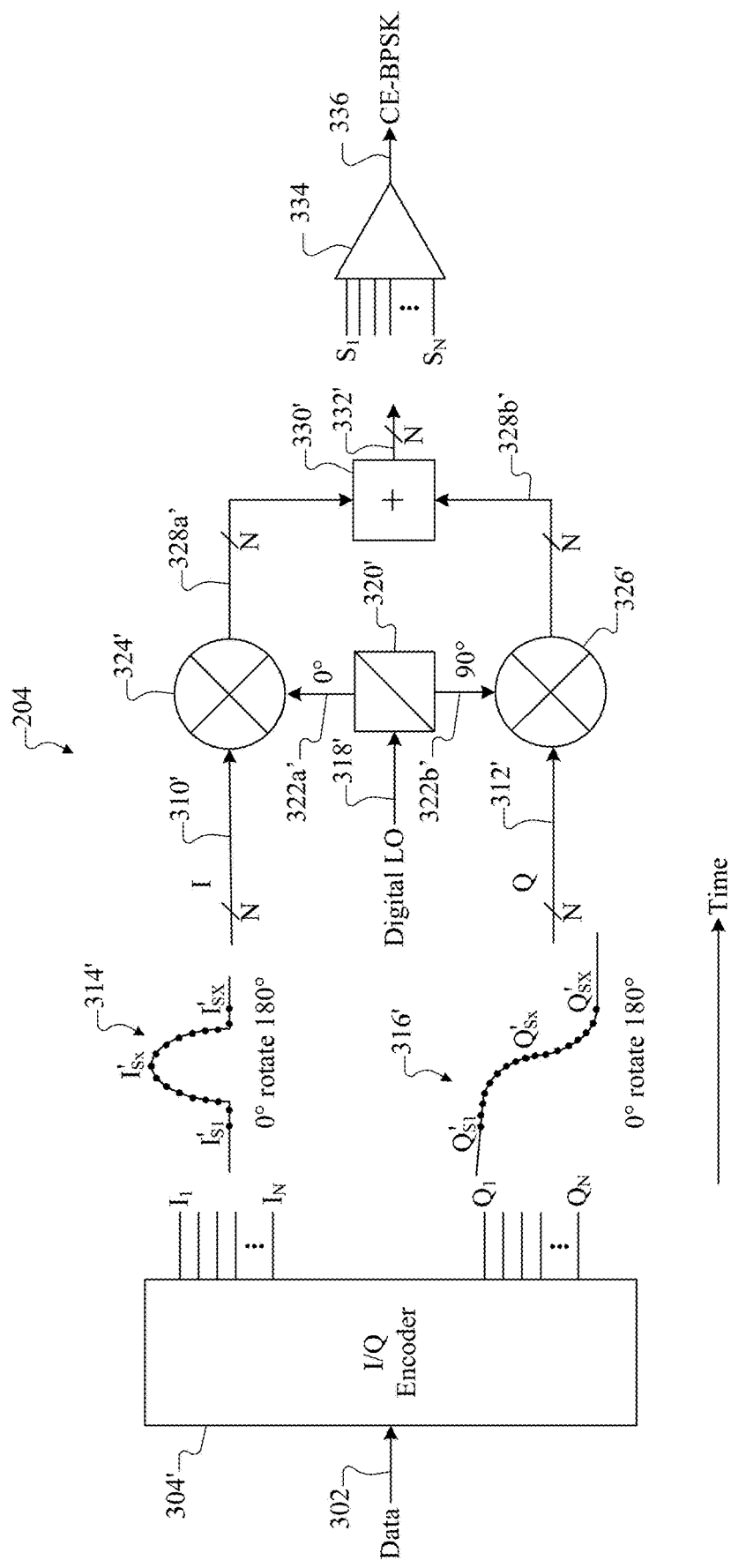

FIGS. 3A and 3B illustrate example CE-BPSK modulators 204 according to this disclosure. Each of these CE-BPSK modulators 204 may, for example, be used in the transmit path 200 of FIG. 2 within the radar system 102 of FIG. 1A or the digital radios 152, 154 of FIG. 1B. Note, however, that the CE-BPSK modulators 204 may be used in any other suitable device, in any other suitable system, and for any other suitable purpose.

As shown in FIG. 3A, one example embodiment of the CE-BPSK modulator 204 receives a digital input data signal 302, which contains the data to be modulated by the CE-BPSK modulator 204. The input data signal 302 may, for example, represent or be based on the input data signal 202 of FIG. 2. Depending on the embodiment, the input data signal 302 may represent a constant source of data to be modulated, or the input data signal 302 may intermittently contain data to be modulated.

The input data signal 302 is provided to an I-Q encoder 304, which is used to encode the data contained in the input data signal 302. In general, the I-Q encoder 304 encodes the data contained in the input data signal 302 into in-phase (I) and quadrature (Q) components, where the normalized component amplitudes can be defined as $I(x)^2+Q(x)^2=1$. The I-Q encoder 304 includes any suitable structure configured to encode data into I and Q components, such as a microprocessor, microcontroller, digital signal processor, application-specific integrated circuit, field programmable gate array, or discrete circuit components.

In this example, the I-Q encoder 304 generates digital values that represent the I and Q components of the data to be transmitted. Thus, the outputs from the I-Q encoder 304 are provided to digital-to-analog (D/A) converters 306 and 308, which are configured to convert the digital values from the I-Q encoder 304 into analog values. While not shown here, the outputs from the I-Q encoder 304 may be subjected to baseband, anti-alias, or other filtering or other operations prior to conversion into the analog domain. Each D/A converter 306, 308 includes any suitable structure configured to convert a digital signal into an analog signal.

The D/A converter 306 here produces an I input signal 310, and the D/A converter 308 here produces a Q input signal 312. The I and Q input signals 310 and 312 collectively represent a substantially-constant amplitude vector with a varying phase, meaning the I and Q input signals 310 and 312 define voltages that represent the amplitude and phase information to be modulated onto an RF waveform. The I and Q input signals 310 and 312 are based on the outputs of the I-Q encoder 304, which can use a waveform table, mathematical calculation, or other technique to generate the digital values used to produce the I and Q input signals 310 and 312. The I and Q input signals 310 and 312 here are respectively associated with waveforms 314 and 316, which are formed by the analog outputs of the D/A converters 306, 308. For instance, the I input signal 310 can be formed by converting digital values for $I_{S1}$-$I_{Sx}$-$I_{SX}$ into corresponding analog values, and the Q input signal 312 can be formed by converting digital values for $Q_{S1}$-$Q_{Sx}$-$Q_{SX}$ into corresponding analog values. Note that the numbers of digital values used to produce the input signals 310, 312 here are for illustration only.

The CE-BPSK modulator 204 also receives a local oscillator (LO) signal 318. The LO signal 318 represents a fixed-frequency RF signal that is produced by a local oscillator. The LO signal 318 is provided to a phase shifter 320, which splits the LO signal 318 into two LO signals 322a-322b. At least one of the LO signals 322a-322b is shifted in phase relative to the other so that the LO signals 322a-322b are 90° out-of-phase with one another. The phase shifter 320 includes any suitable structure configured to divide an RF signal and to shift the phase of at least one portion of the RF signal so that different portions of the RF signal are 90° out-of-phase with one another.

A first mixer 324 mixes the LO signal 322a with the I input signal 310, and a second mixer 326 mixes the LO signal 322b with the Q input signal 312. This produces two mixed signals 328a-328b, which are combined by an equal phase signal combiner 330 to produce a CE-BPSK modulated signal 332. Each mixer 324, 326 includes any suitable structure configured to mix RF signals. The signal combiner 330 includes any suitable structure configured to combine RF signals in phase such that a single sideband representation of the I and Q signals is formed as the CE-BPSK modulated signal 332 from the quadrature modulator.

As noted above, the I and Q input signals 310 and 312 are associated with waveforms 314 and 316, and example portions of the waveforms 314 and 316 for the I and Q input signals 310 and 312 are shown in FIG. 3A. More specifically, these portions of the waveforms 314 and 316 represent how the I and Q input signals 310 and 312 may vary during a phase reversal from 0° to 180°. Similar waveforms 314 and 316 may be used during a phase reversal from 180° to 0°, although the waveform 316 can be inverted or reversed (transition from low to high) during a phase reversal from 180° to 0°. Likewise, the waveform 314 can be inverted or reversed (transition from low to high) or use a negative rather than positive voltage during a phase reversal from 180° to 0°.

As can be seen in FIG. 3A, the waveform 316 transitions from a relatively high value to a relatively low value. This indicates that a bit transition is occurring, meaning the bit values to be modulated onto the CE-BPSK modulated signal 332 are switching from a "one" to a "zero" (or vice versa). The waveform 316 may use any suitable transitions between high and low values to represent the data bits being encoded.

In some cases, the waveform 316 may represent a portion of a cosine signal, a square root raised cosine signal, a ramp signal, a step signal, or other suitable signal.

Because of the transition in the waveform 316, a phase reversal occurs in the CE-BPSK modulated signal 332. If the I input signal 310 is kept constant during the phase reversal, the amplitude of the CE-BPSK modulated signal 332 would drop from a specified level to a zero or substantially zero amplitude and then increase back to the specified level (although the signal would have an opposite phase). However, rather than keeping the I input signal 310 constant, the I input signal 310 here varies by increasing and then decreasing in amplitude during the phase reversal (although the opposite may also occur). The waveform 314 may use any suitable transitions during a phase reversal. In some cases, the waveform 314 may represent a portion of a sine signal, a square root raised sine signal, a trapezoid signal, or other suitable signal.

By changing both the I and Q input signals 310 and 312 in this manner during the phase reversal, the frequency (rather than the amplitude) of the CE-BPSK modulated signal 332 can be changed. That is, the waveforms 314 and 316 of the I and Q input signals 310 and 312 contain complementary transitions that alter the frequency of the CE-BPSK modulated signal 332 while maintaining a substantially-constant amplitude of the CE-BPSK modulated signal 332. As a result, the amplitude of the CE-BPSK modulated signal 332 can remain substantially unchanged during the phase reversal, but the frequency of the CE-BPSK modulated signal 332 can increase (accelerate) or decrease (decelerate) in order to adjust the phase of the CE-BPSK modulated signal 332. As a result, this approach uses changes in the frequency of the CE-BPSK modulated signal 332 to achieve a 180° phase shift during a phase reversal while keeping the amplitude of the CE-BPSK modulated signal 332 substantially constant. In this way, the CE-BPSK modulated signal 332 maintains a substantially-constant envelope even during phase reversals.

As shown in FIG. 3B, another example embodiment of the CE-BPSK modulator 204 includes a quadrature modulator that is fully realized in the digital domain. Here, the digital input data signal 302 is provided to an I/Q encoder 304', which can generate N-bit I and Q digital values $I_1$-$I_N$ and $Q_1$-$Q_N$. The N-bit I values here define part of a waveform 314' of an I input signal 310' using a sequence of N-bit digital values $I'_{S1}$-$I'_{Sx}$-$I'_{SX}$, and the N-bit Q values here define part of a waveform 316' of a Q input signal 312' using a sequence of N-bit digital values $Q'_{S1}$-$Q'_{Sx}$-$Q'_{SX}$. A digital LO signal 318' is provided to a phase shifter 320', which generates two digital LO signals 322a'-322b' that are 90° out-of-phase with each other (such as by copying the digital LO signal 318' and delaying one of the copies). The I and Q input signals 310' and 312' are up-sampled and digitally multiplied with the digital LO signals 322a'-322b' at the desired output center frequency by digital mixers 324' and 326'. The resulting digital mixed signals 328a'-328b' are combined by a combiner 330', such as a digital adder, to produce a digital CE-BPSK signal 332'. The different digital values $S_1$-$S_N$ contained in the digital CE-BPSK signal 332' can be provided to a D/A converter 334, which may convert the digital values into an analog CE-BPSK signal 336. Note that the same or similar process used above the control the transitions in the waveforms 314 and 316 to produce a CE-BPSK output signal having a substantially-constant envelope can be used in FIG. 3B to control the transitions in the waveforms 314' and 316'.

Although FIGS. 3A and 3B illustrate examples of CE-BPSK modulators 204, various changes may be made to FIGS. 3A and 3B. For example, as noted above, the waveforms 314, 316, 314', 316' of the I and Q input signals 310, 312, 310', 312' can vary from those shown in FIGS. 3A and 3B. Also, the I and Q input signals 310, 312, 310', 312' may be generated in any other suitable manner, and the CE-BPSK modulated signal 332, 332', 336 may be provided to any suitable destination(s) and used in any suitable manner.

Figure 4:
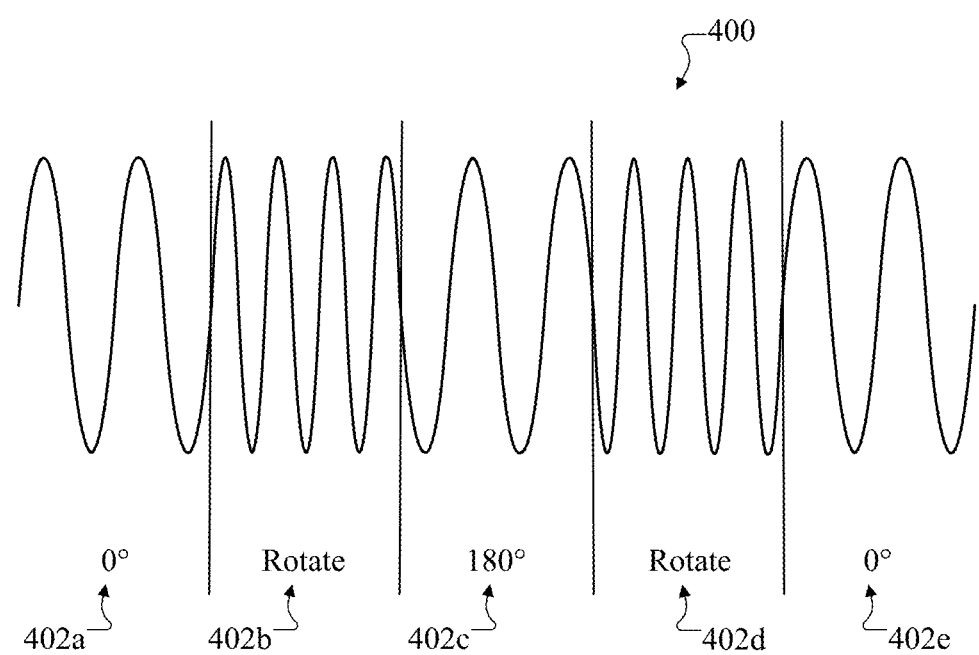
FIG. 4 illustrates an example waveform generated using CE-BPSK modulation according to this disclosure.

FIG. 4 illustrates an example waveform 400 generated using CE-BPSK modulation according to this disclosure. The waveform 400 may, for example, represent the CE-BPSK modulated signal 332 or 336 generated by the CE-BPSK modulator 204 in FIG. 3A or 3B. Note, however, that the CE-BPSK modulator 204 may generate CE-BPSK modulated signals having any other suitable waveforms.

As shown in FIG. 4, the waveform 400 is generated over the span of multiple consecutive time periods 402a-402e. During the time periods 402a and 402e, the waveform 400 has a phase of 0°. During the time period 402c, the waveform 400 has a phase of 180°. Thus, the waveform 400 can encode "zero" and "one" digital values based on different phases of the waveform 400.

The time periods 402b and 402d represent times when phase reversals occur in the waveform 400. In this particular example, the time periods 402b and 402d are associated with frequency accelerations of the waveform 400 since the frequency of the waveform 400 increases during the time periods 402b and 402d. The increased frequency shifts the phase of the waveform 400 by 180° between the time periods 402a, 402c and between the time periods 402c, 402e. Note that a similar result may be obtained using frequency decelerations of the waveform 400, which decrease the frequency of the waveform 400 during the time periods 402b and 402d. The decreased frequency would again shift the phase of the waveform 400 by 180° between the time periods 402a, 402c and between the time periods 402c, 402e. As can be seen here, the amplitude (measured from the tops of the peaks to the bottoms of the valleys in the waveform 400) remains substantially constant, even during the phase rotations.

Although FIG. 4 illustrates one example of a waveform 400 generated using CE-BPSK modulation, various changes may be made to FIG. 4. For example, the lengths of the time periods 402a-402e are for illustration only and can vary as needed or desired. Also, the lengths of the periods when the waveform 400 has the 0° and 180° phases can vary based on the specific data being encoded in the waveform 400.

Figure 5:
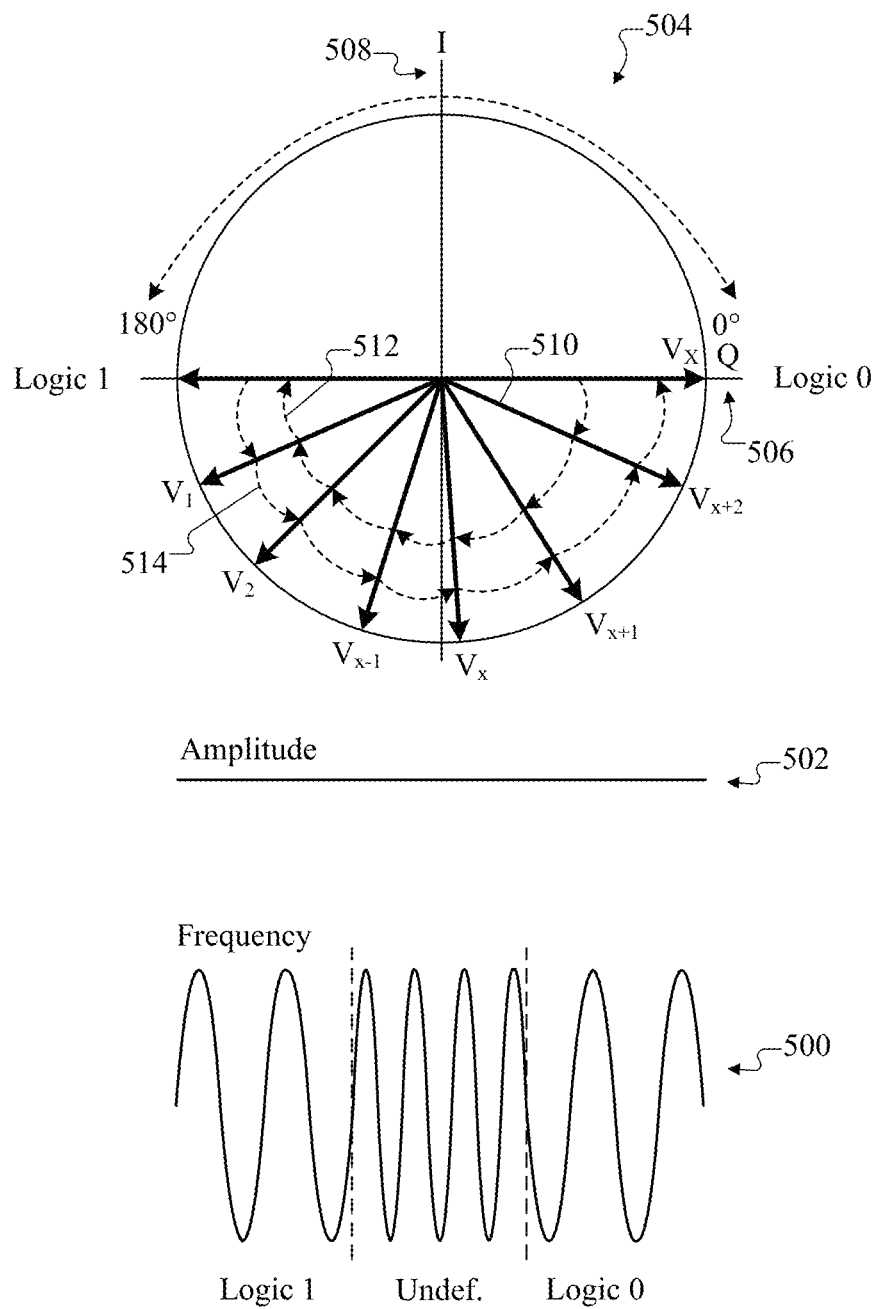
FIG. 5 illustrates example plots associated with a phase reversal during CE-BPSK modulation according to this disclosure.

FIG. 5 illustrates example plots associated with a phase reversal during CE-BPSK modulation according to this disclosure. In particular, FIG. 5 illustrates an example frequency plot 500, an example amplitude plot 502, and an example polar plot 504 associated with a CE-BPSK modulated waveform. The CE-BPSK modulated waveform here may be generated by the CE-BPSK modulator 204 in FIG. 3A or 3B and have the form shown in FIG. 4. Note, however, that the CE-BPSK modulator 204 may generate CE-BPSK modulated signals having any other suitable waveforms.

As shown in FIG. 5, the frequency plot 500 illustrates frequencies of the CE-BPSK modulated waveform during three consecutive time periods. These time periods include a first time period associated with a first data value (a logical "one") and a third time period associated with a second data value (a logical "zero"). These time periods also include a second time period in which frequency acceleration or deceleration is used to perform a phase reversal to support a phase shift from 180° to 0° (although the opposite reversal may occur when switching from a logical "zero" to a logical "one"). The amplitude plot 502 indicates that the amplitude (and therefore the envelope) of the CE-BPSK modulated waveform remains substantially-constant before, during, and after the phase reversal.

In the polar plot 504, two orthogonal axes are defined, namely a horizontal axis 506 associated with the Q input of the CE-BPSK modulator 204 and a vertical axis 508 associated with the I input of the CE-BPSK modulator 204. Vectors 510 represent the magnitude (amplitude) and direction (phase) of the CE-BPSK modulated waveform over time during a phase reversal. The vectors 510 are associated with voltages $V_1$-$V_x$-$V_{x'}$, which represent the voltages defined by the analog values $I_{S1}$-$I_{Sx}$-$I_{SX}$ and $Q_{S1}$-$Q_{Sx}$-$Q_{SX}$ or digital values $I'_{S1}$-$I'_{Sx}$-$I'_{SX}$ and $Q'_{S1}$-$Q'_{Sx}$-$Q'_{SX}$. As can be seen in the polar plot 504, the multiple vectors 510 indicate that the CE-BPSK modulator 204 can step through a number of phases 512 or 514 between 0° and 180° or between 180° and 0° during a phase reversal while the lengths of the vectors 510 remain substantially constant, which indicates that the amplitude of the CE-BPSK modulated waveform remains substantially-constant during the phase reversal. However, the vectors 510 shift in direction or rotate during the phase reversal, which here occurs right-to-left (phases 512) for a 0° to 180° phase shift and left-to-right (phases 514) for a 180° to 0° phase shift.

Using conventional BPSK, a horizontal vector pointing at 0° would shorten over time until reaching zero and then lengthen over time while pointing to 180° (or the opposite phase flip may occur). This is because the amplitude of the BPSK signal would drop to zero or substantially zero, creating an amplitude dropout that can cause various problems discussed above. As shown here, however, the vectors 510 remain substantially-constant and rotate during a phase reversal, which indicates that the CE-BPSK modulated waveform avoids the problems associated with amplitude dropout discussed above.

Although FIG. 5 illustrates examples of plots 500, 502, 504 associated with a phase reversal during CE-BPSK modulation, various changes may be made to FIG. 5. For example, the number of vectors 510 can vary during a phase reversal. Also, the associations between the 0° and 180° phases and the logical "zero" and "one" values can vary if needed or desired. Further, while the amplitude of the CE-BPSK modulated waveform may remain substantially-constant here, some variations to the amplitude of the CE-BPSK modulated waveform may be expected due to non-ideal behaviors or other imperfections in circuit fabrication and operation. In addition, while the amplitude of the CE-BPSK modulated waveform itself may remain substantially constant, a filter 206 and/or a saturated power amplifier 208 may impart some non-constant level to a filtered and amplified version of the CE-BPSK modulated waveform.

Figure 6:
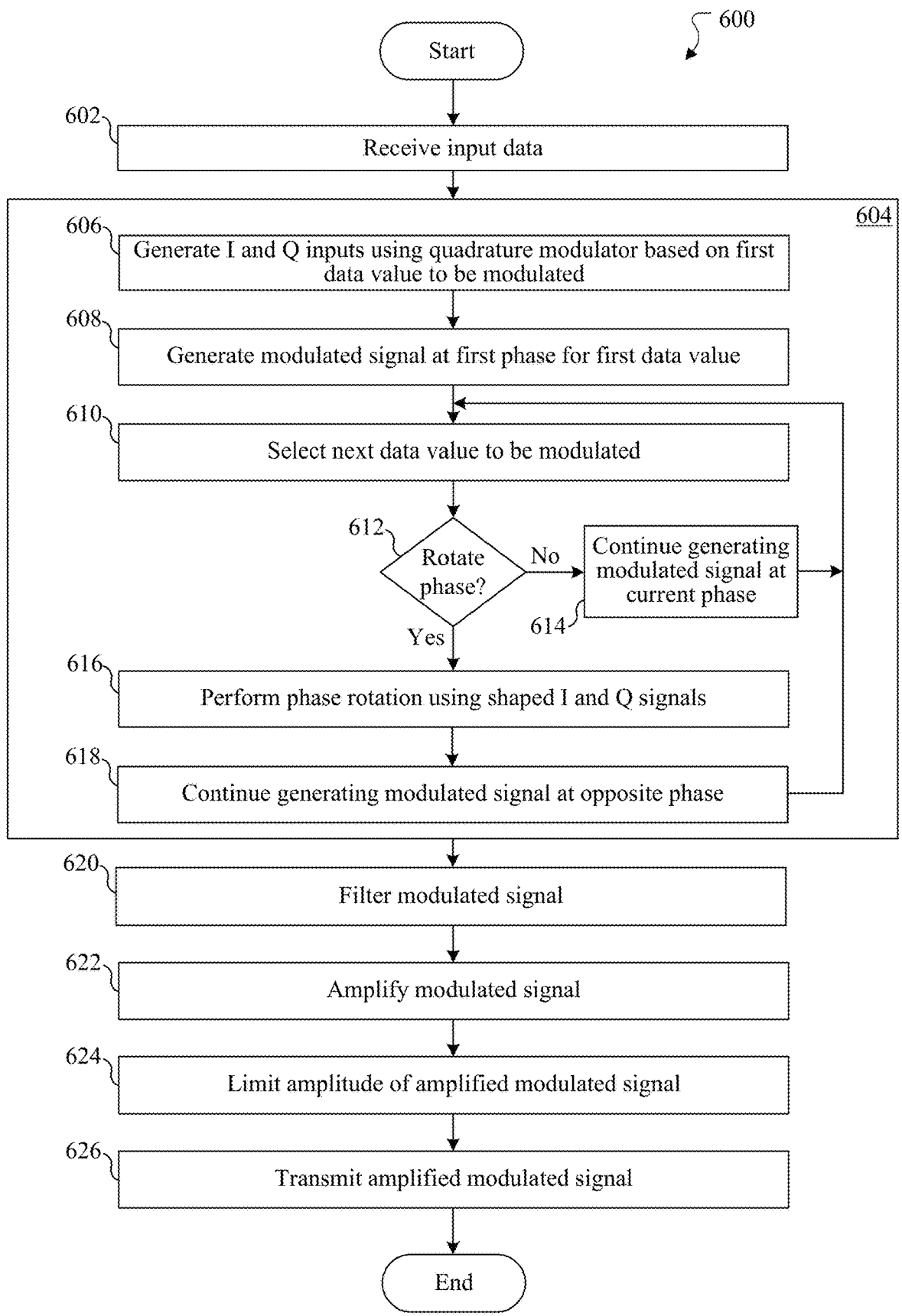
FIG. 6 illustrates an example method for CE-BPSK modulation according to this disclosure.

FIG. 6 illustrates an example method 600 for CE-BPSK modulation according to this disclosure. For ease of explanation, the method 600 is described as being performed using the transmit path 200 of FIG. 2, which may be used in the system 100 of FIG. 1A or in the system 150 of FIG. 1B. However, the method 600 may be performed using any other suitable device and in any other suitable system.

As shown in FIG. 6, input data is received at step 602. This may include, for example, the transmit path 200 receiving the input data signal 202 from a suitable source, where the input data signal 202 identifies data to be encoded onto an RF signal. CE-BPSK modulation is performed to modulate the input data onto the RF signal at step 604. This may include, for example, the CE-BPSK modulator 204 generating a modulated RF signal containing encoded data, where the modulated RF signal uses two phases to represent digital values and includes phase reversals.

In this example, the CE-BPSK modulation involves generating I and Q input signals to an I-Q quadrature modulator based on the first data value to be modulated at step 606. This may include, for example, the I-Q encoder 304, 304' outputting values that cause the I and Q input signals 310, 312, 310', 312' to achieve desired values for encoding the first data value. A modulated signal is generated at a first phase representing the first data value using the I-Q quadrature modulator at step 608. This may include, for example, the CE-BPSK modulator 204 generating a CE-BPSK modulated signal 332, 336 having a 0° phase for one data value or a 180° phase for another data value. The next data value to be modulated is selected at step 610, and a determination is made whether phase rotation is needed at step 612, such as by determining if there is a bit transition based on the input data signal 202. If not, generation of the modulated signal continues using the current phase at step 614, and the process returns to step 610 where the next data value to be encoded is selected. If a phase rotation is needed at step 612, the phase rotation is performed using shaped I and Q input signals for the I-Q quadrature modulator at step 616. This may include, for example, the I-Q encoder 304, 304' outputting additional values that produce complementary transitions in the I and Q input signals 310, 312, 310', 312', where the complementary transitions will alter the frequency of the CE-BPSK modulated signal 332, 336 while maintaining a substantially-constant amplitude of the CE-BPSK modulated signal 332, 336. Generation of the modulated signal continues using the new (opposite) phase at step 618, and the process returns to step 610 where the next data value to be encoded is selected.

The modulated signal is filtered at step 620 and amplified at step 622. This may include, for example, the filter 206 filtering the CE-BPSK modulated signal 332, 336 and the saturated power amplifier 208 amplifying the filtered version of the CE-BPSK modulated signal 332, 336. An amplitude of the amplified signal can be limited at step 624. This may include, for example, the amplitude limiter 210 of the power amplifier 208 limiting the amplitude of the amplified version of the CE-BPSK modulated signal 332, 336. The amplified signal can be transmitted to one or more destinations at step 626. This may include, for example, transmitting the amplified version of the CE-BPSK modulated signal 332, 336 as the output modulated signal 212 to one or more destinations.

Although FIG. 6 illustrates one example of a method 600 for CE-BPSK modulation, various changes may be made to FIG. 6. For example, while shown as a series of steps, various steps in FIG. 6 may overlap, occur in parallel, occur in a different order, or occur any number of times. Also, one or more steps in FIG. 6 may be repeated or omitted as needed or desired.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining an in-phase (I) input signal and a quadrature (Q) input signal at a quadrature modulator; and
   performing constant envelope bi-phase shift keying (CE-BPSK) modulation using the quadrature modulator to generate a modulated output signal;
   wherein the modulated output signal comprises a CE-BPSK modulated waveform containing phase reversals, the CE-BPSK modulated waveform having a substantially-constant amplitude during the phase reversals; and
   wherein the quadrature modulator causes the modulated output signal to step through a number of phases during each phase reversal while maintaining the substantially-constant amplitude.

2. The method of claim 1, wherein the CE-BPSK modulated waveform contains 180° phase reversals while having the substantially-constant amplitude.

3. The method of claim 1, wherein the quadrature modulator uses the I and Q input signals to steer a signal vector around a polar plane with a substantially-constant envelope.

4. The method of claim 1, further comprising:
   filtering the modulated output signal using a narrowband filter to generate a filtered modulated output signal;
   amplifying the filtered modulated output signal using a saturated power amplifier to generate an amplified filtered modulated output signal; and
   limiting an amplitude of the amplified filtered modulated output signal.

5. The method of claim 1, wherein the substantially-constant amplitude has no more than ±2 dB of variation.

6. A method comprising: The method of claim 1,
   obtaining an in-phase (I) input signal and a quadrature (Q) input signal at a quadrature modulator; and
   performing constant envelope bi-phase shift keying (CE-BPSK) modulation using the quadrature modulator to generate a modulated output signal;
   wherein the modulated output signal comprises a CE-BPSK modulated waveform containing phase reversals, the CE-BPSK modulated waveform having a substantially-constant amplitude during the phase reversals; and
   wherein complementary transitions in the I and Q input signals accelerate or decelerate a frequency of the modulated output signal in order to change a phase of the modulated output signal.

7. A method comprising: The method of claim 1,
   obtaining an in-phase (I) input signal and a quadrature (Q) input signal at a quadrature modulator; and
   performing constant envelope bi-phase shift keying (CE-BPSK) modulation using the quadrature modulator to generate a modulated output signal;
   wherein the modulated output signal comprises a CE-BPSK modulated waveform containing phase reversals, the CE-BPSK modulated waveform having a substantially-constant amplitude during the phase reversals; and
   wherein the I and Q input signals comprise complementary transitions that alter a frequency of the modulated output signal.

8. An apparatus comprising:
   a quadrature modulator configured to:
      obtain an in-phase (I) input signal and a quadrature (Q) input signal; and
      perform constant envelope bi-phase shift keying (CE-BPSK) modulation to generate a modulated output signal, wherein the modulated output signal comprises a CE-BPSK modulated waveform containing phase reversals, the CE-BPSK modulated waveform having a substantially-constant amplitude during the phase reversals;
   wherein the quadrature modulator is configured to cause the modulated output signal to step through a number of phases during each phase reversal while maintaining the substantially-constant amplitude.

9. The apparatus of claim 8, wherein the quadrature modulator is configured to generate the CE-BPSK modulated waveform containing 180° phase reversals while having the substantially-constant amplitude.

10. The apparatus of claim 8, wherein the quadrature modulator is configured to use the I and Q input signals to steer a signal vector around a polar plane with a substantially-constant envelope.

11. The apparatus of claim 8, wherein complementary transitions in the I and Q input signals accelerate or decelerate a frequency of the modulated output signal in order to change a phase of the modulated output signal.

12. The apparatus of claim 8, wherein the phases during each phase reversal are associated with different analog or digital I and Q values that result in different phases between 0° and 180° during the phase reversal.

13. The apparatus of claim 8, wherein the quadrature modulator comprises:
    an I-Q encoder configured to receive data and generate digital values based on the data, wherein the I and Q input signals are based on the digital values;
    a first mixer configured to mix the I input signal and a first local oscillator (LO) signal to generate a first mixed signal;
    a second mixer configured to mix the Q input signal and a second LO signal to generate a second mixed signal, wherein the second LO signal is 90° out of phase with the first LO signal; and
    a combiner configured to generate the modulated output signal using the first and second mixed signals.

14. The apparatus of claim 8, wherein the substantially-constant amplitude has no more than ±2 dB of variation.

15. A system comprising:
    a quadrature modulator configured to obtain an in-phase (I) input signal and a quadrature (Q) input signal and perform constant envelope bi-phase shift keying (CE-BPSK) modulation to generate a modulated output signal;
    a filter configured to filter the modulated output signal and generate a filtered modulated output signal; and
    a saturated power amplifier configured to amplify the filtered modulated output signal and generate an amplified filtered modulated output signal;
    wherein the modulated output signal comprises a CE-BPSK modulated waveform containing phase reversals, the CE-BPSK modulated waveform having a substantially-constant amplitude during the phase reversals; and
    wherein the quadrature modulator is configured to cause the modulated output signal to step through a number of phases during each phase reversal while maintaining the substantially-constant amplitude.

16. The system of claim 15, wherein the quadrature modulator is configured to use the I and Q input signals to steer a signal vector around a polar plane with a substantially-constant envelope.

17. The system of claim 15, wherein the quadrature modulator comprises:
    an I-Q encoder configured to receive data and generate digital values based on the data, wherein the I and Q input signals are based on the digital values;
    a first mixer configured to mix the I input signal and a first local oscillator (LO) signal to generate a first mixed signal;
    a second mixer configured to mix the Q input signal and a second LO signal to generate a second mixed signal, wherein the second LO signal is 90° out of phase with the first LO signal; and
    a combiner configured to generate the modulated output signal using the first and second mixed signals.

18. The system of claim 15, further comprising:
    an amplitude limiter configured to limit an amplitude of the amplified filtered modulated output signal.

19. The system of claim 15, wherein the phases during each phase reversal are associated with different analog or digital I and Q values that result in different phases between 0° and 180° during the phase reversal.

20. The system of claim 15, wherein the substantially-constant amplitude has no more than ±2 dB of variation.

* * * * *